(12) United States Patent
Dubois et al.

(10) Patent No.: US 8,381,408 B2
(45) Date of Patent: Feb. 26, 2013

(54) METHOD FOR DETERMINING A CONTOUR DATA SET OF SPECTACLE FRAME RIM

(75) Inventors: Frédéric Dubois, Charenton-le-Pont (FR); David Freson, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 135 days.

(21) Appl. No.: 12/810,956

(22) PCT Filed: Dec. 23, 2008

(86) PCT No.: PCT/EP2008/068262
§ 371 (c)(1),
(2), (4) Date: Jun. 28, 2010

(87) PCT Pub. No.: WO2009/065960
PCT Pub. Date: May 28, 2009

(65) Prior Publication Data
US 2010/0290002 A1    Nov. 18, 2010

(30) Foreign Application Priority Data
Dec. 28, 2007  (EP) .................................... 07301762

(51) Int. Cl.
*G01B 11/24* (2006.01)
*G01B 5/20* (2006.01)
*G01B 7/28* (2006.01)
(52) U.S. Cl. .......................................... 33/200; 33/507
(58) Field of Classification Search .................. 33/200, 33/28, 507; 700/117; 702/167, 168; 351/177
See application file for complete search history.

(56) References Cited

U.S. PATENT DOCUMENTS

| | | | | |
|---|---|---|---|---|
| 5,121,548 A | * | 6/1992 | Daboudet et al. | 33/507 |
| 5,139,373 A | * | 8/1992 | Logan et al. | 409/80 |
| 5,428,448 A | * | 6/1995 | Albert-Garcia | 356/612 |
| 5,450,335 A | * | 9/1995 | Kikuchi | 702/168 |
| 5,485,399 A | | 1/1996 | Saigo et al. | |
| 5,881,467 A | | 3/1999 | Clara et al. | |
| 6,006,592 A | * | 12/1999 | Suzuki et al. | 73/104 |
| 6,122,063 A | * | 9/2000 | Berndt et al. | 356/623 |
| 6,655,802 B2 | * | 12/2003 | Zimmermann et al. | 351/169 |
| 6,845,678 B2 | | 1/2005 | Igarashi et al. | |
| 7,613,539 B2 | * | 11/2009 | Bae et al. | 700/182 |
| 2001/0035933 A1 | * | 11/2001 | Iwai et al. | 351/41 |
| 2003/0017783 A1 | * | 1/2003 | Bernard et al. | 451/5 |
| 2005/0254007 A1 | * | 11/2005 | Wang et al. | 351/177 |
| 2006/0273268 A1 | | 12/2006 | Bae et al. | |
| 2007/0265727 A1 | | 11/2007 | Bae et al. | |

FOREIGN PATENT DOCUMENTS

| | | |
|---|---|---|
| EP | 0 583 915 | 2/1994 |
| EP | 0 991 496 | 4/2000 |
| WO | WO 99/55490 | 11/1999 |

\* cited by examiner

*Primary Examiner* — Christopher Fulton
(74) *Attorney, Agent, or Firm* — Cozen O'Connor

(57) ABSTRACT

A method for determining a contour data set of a spectacle frame rim comprising the steps of: a) providing a plurality (N) of three dimensional measured points along a contour of a spectacle frame rim; b) calculating a plurality of best torus that fits P points chosen among the N measured points and where P is equal or more than 4; c) selecting the (T) points among the N measured points that deviate from one of the best torus more than a threshold value; and d) forming the contour data set with (N-T) three dimensional measured points where the T selected points of step c) are excluded from the list of three dimensional measured points of step a).

15 Claims, No Drawings

METHOD FOR DETERMINING A CONTOUR DATA SET OF SPECTACLE FRAME RIM

RELATED APPLICATIONS

This is a U.S. national stage of application No. PCT/EP2008/068262, filed on Dec. 23, 2008.

This application claims the priority of European application no. 07301762.6, filed Dec. 28, 2007, the entire content of which is hereby incorporated by reference.

FIELD OF THE INVENTION

The present invention is generally concerned with determining and/or providing a contour data set of spectacle frame rim.

BACKGROUND OF THE INVENTION

Determining and/or providing said contour data set of a spectacle frame (also called eyeglass frame) rim is usually carried out in order to match to the frame the ophthalmic lenses to be mounted therein.

Devices have been developed to measure the contour of a spectacle frame. As for an example, contour follower devices which can "read" any shape such as the contours of rims or surrounds of any spectacle frame, for the purpose of trimming lenses to be fitted thereto, are widely used by eye care practitioners (ECP).

Contour follower devices generally use a feeler with a contact head to be applied to the article. Known contour follower devices comprise a support table fitted with holding means adapted to support the article whose contour is to be read off and the feeler is carried by a carriage which can reciprocate along a straight line path of the support, with rotation means for relative rotation between the support table and the carriage support. This type of contour follower devices provides a plurality of three dimensional points along a contour of a spectacle frame. These three dimensional measured points can be provided either using polar coordinates or orthogonal coordinates.

An example of a known contour follower device is disclosed in patent document U.S. Pat. No. 5,121,548.

Other means may be implemented to provide a plurality of three dimensional measured points along a contour of a spectacle frame, such as, for example, devices using laser measurements.

The plurality of three dimensional measured points along a contour of a spectacle frame is usually provided to a computer and used to calculate the edging parameter of ophthalmic lens to be manufactured for a given wearer and that would fit a chosen spectacle frame.

The present inventors have noticed that the raw three dimensional measured points provided by contour measurement devices may comprise singular points that can significantly affect the calculation of the edging contour of the final ophthalmic lens.

In some cases, the use of said singular points may lead to calculation divergence and thus to erroneous results.

There remains thus a need for improving the contour data set of a spectacle frame rim.

SUMMARY OF THE INVENTION

One object of the present invention is to improve said contour data set with an appropriate filtering method.

This object is obtained according to one aspect of the present invention directed to a method for determining a contour data set of a spectacle frame rim comprising the steps of:

a) providing a plurality (N) of three dimensional measured points along a contour of a spectacle frame rim;

b) calculating a plurality of best torus that fits P points chosen among the N measured points and where P is equal or more than 4;

c) selecting the (T) points among the N measured points that deviate from one of the best torus more than a threshold value;

d) forming the contour data set with (N-T) three dimensional measured points where the T selected points of step c) are excluded from the list of three dimensional measured points of step a).

According to an embodiment of the present invention and thanks to forming a filtered contour data set of a spectacle frame rim, the singular points may be rejected from the final data set. Erroneous results in the final ophthalmic lens edging parameter or contour may then be avoided.

According to an embodiment of the present invention a "torus" is a surface defined as the product of two circles $C_1$ and $C_2$ and this wording is used widely so as to designate a sphere when $C_1$ is equal to $C_2$ or a non spherical torus when $C_1$ differs from $C_2$. Each sphere $C_1$, $C_2$ of the torus is characterized by its radius $R_1$, $R_2$.

The threshold value can be a given value or a value calculated using the three dimensional measured points.

According to different embodiments of the present invention that may be combined:
- the P points of step b) are consecutive points;
- the best torus to be calculated in step b) are spheres and P=4;
- the best torus to be calculated in step b) are non spherical torus and P=6;
- the P points used to calculate a best torus are different from best torus to best torus;
- before step c), a substep is implemented to calculate the mean and variance of the radii of the best torus calculated in step b) and the threshold value is said variance;
- the contour is a circumference of a spectacle frame;
- the contour is an open path of a spectacle frame;
- the contour is a U-shaped or V-shaped groove of the spectacle frame;
- the contour is an edge of the spectacle frame.

The present invention also relates to a method for providing contour data of a spectacle frame rim comprising the steps of:
measuring a plurality (N) of three dimensional points along a contour of a spectacle frame rim;
determining the contour data set;
inputting said contour data set in a computer system.

According to an embodiment of said method the method also comprises inputting in the computer system a set of data including wearer's prescription data.

The present invention also relates to a method of calculating an optical system (OS) of an ophthalmic lens according to a given spectacle frame comprising the steps of:
providing the contour data set of the spectacle frame,
providing wearer's data,
optimization of the optical system (OS) according to at least the criteria consisting of said contour data set of the spectacle frame, the wearer's data and at least one positioning data, so as to generate at least two optical surfaces ($S_1$, $S_2$).

Another aspect of the present invention relates to a computer program product comprising one or more stored sequences of instruction that is accessible to a processor and which, when executed by the processor, causes the processor to carry out the steps of preceding method for determining and/or providing a contour data set of a spectacle frame rim.

Another aspect of the present invention relates to a computer readable medium carrying one or more sequences of instructions of the here above computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

DETAILED DESCRIPTION OF EMBODIMENTS OF THE INVENTION

The novel features of this invention, as well as the invention itself, both as to its structure and its operation, will be best understood from the accompanying non limiting examples.

After choosing a spectacle frame, a plurality of N three dimensional points is provided thanks to a measuring device. The measuring device can be for example a contour follower device as disclosed in patent document U.S. Pat. No. 5,121,548. Numerous other suitable measuring devices exist, such as other contour follower devices or devices without contact head, as for example laser measurement devices may also be used.

Contour follower devices known from the state of the art usually provide between 400 and 1500 three dimensional points, for example 800 points. The step between two points can be either an angular step or a distance step.

The measured points can be expressed using polar coordinates $(\rho_j, \theta_j)$ or using orthogonal coordinates $(x_j, y_j, z_j)$ where $j=1, \ldots N$.

Known metrics permits the transformation of polar coordinates into orthogonal coordinates and reverse.

In the following example the filtering method of the invention uses spheres to select the points that deviate more than a threshold value.

It has to be understood that the same principles may apply to a filtering method where aspherical torus are used to select the points that deviate more than a threshold value.

According to the present example: the N measured points are gathered in N/4 (or (N/4)−1, if N is not a multiple of 4) sets. Each set consists of 4 consecutive measured points.

The best sphere, $S_i$, that fits the 4 consecutive measured points of each set, is calculated and its radius $R_i$ and center $C_i$ is determined where $i=1 \ldots N/4$ (or N/4−1). It has to be noticed that the choice of 4 points to be fitted is advantageous because the sphere that fits those points is unique.

In order to calculate the coordinates of the center $C=(x_c, y_c, z_c)$ and the radius R of a best sphere S that fits 4 points $P_1$, $P_2$, $P_3$, $P_4$, which coordinates are respectively $(x_1, y_1, z_1)$, $(x_2, y_2, z_2)$, $(x_3, y_3, z_3)$, $(x_4, y_4, z_4)$, following metrics may be used based on equations (1) to (4):

$$(x_1-x_c)^2+(y_1-Y_c)^2+(z_1-z_c)^2=R^2 \quad (1)$$

$$(x_2-x_c)^2+(y_2-y_c)^2+(z_2-z_c)^2=R^2 \quad (2)$$

$$(x_3-x_c)^2+(y_3-y_c)^2+(z_3-z_c)^2=R^2 \quad (3)$$

$$(x_1-x_c)^2+(y_1-y_c)^2(z_1-z_c)^2=R^2 \quad (4)$$

Following linear system has then to be solved:

$$Av = b \quad (5)$$

Where $$A = 2\begin{pmatrix} x_2 - x_1 & y_2 - y_1 & z_2 - z_1 \\ x_3 - x_1 & y_3 - y_1 & z_3 - z_1 \\ x_4 - x_1 & y_4 - y_1 & z_4 - z_1 \end{pmatrix};$$

$$v = \begin{pmatrix} x_c \\ y_c \\ z_c \end{pmatrix};$$

and $$b = \begin{pmatrix} x_2^2 - x_1^2 + y_2^2 - y_1^2 + z_2^2 - z_1^2 \\ x_3^2 - x_1^2 + y_3^2 - y_1^2 + z_3^2 - z_1^2 \\ x_4^2 - x_1^2 + y_4^2 - y_1^2 + z_4^2 - z_1^2 \end{pmatrix}$$

If the determinant of A is nil, the 4 points $P_1$, $P_2$, $P_3$, $P_4$ are coplanar and they are rejected.

If the determinant of A is not nil, the equation (5) can be solved using matrix calculation known from the man skilled in the art. An example of a suitable calculation method is given by the well known "LU" method.

After calculating the series of best spheres characteristics $(C_i, R_i)$, the mean $R_m$ and the variance $\sigma_R$ of the whole best sphere radii $(R_i, i=1, \ldots N/4$ or $i=1 \ldots N/4-1)$ are calculated.

According to an embodiment, the threshold value is the variance $\sigma_R$ of the best sphere radii.

According to other embodiments, the threshold value is a given value that can be obtained thanks to experiments.

The radius of the best sphere $S_i$ corresponding to a set of points ($P_{1,i}$, $P_{2,i}$, $P_{3,i}$, $P_{4,i}$) is then compared to the mean radius, $R_m$, of the whole best sphere radii.

If the radius $R_i$ of said best sphere $S_i$ deviates from the mean radius, $R_m$, more than the threshold value, the set of points ($P_{1,i}$, $P_{2,i}$, $P_{3,i}$, $P_{4,i}$) is rejected.

The final contour data set comprises only the three dimensional measured points that have not been rejected according to preceding method.

The inventors have demonstrated that these rejected points are singular points and that the filtering of said singular points improves significantly the calculations based on the edging contour data, namely the calculation of edging parameters or contour of an ophthalmic lens to be fitted to the measured contour of a given spectacle frame.

It has to be understood that the present method for determining a contour data set of a spectacle frame rim may apply to any type of spectacle frames, for example metal frames, plastic frames, combination frames, fully rimmed frames where the contour is a circumference, semi-rimmed (or semi-rimless) frames where the contour is an open path.

It may also apply to any type of spectacle frame rims, for example rims with V-shaped grooves usually corresponding to metal or plastic fully rimmed frames, with U-shaped grooves usually corresponding to semi-rimless frames.

The present method may also be applied for determining contour of edges of spectacle frames or every chosen contour along a line within the spectacle frame rim.

The resulting contour data set may be provided to a computer system in order to calculate an optical system (OS) of an ophthalmic lens according to a given spectacle lens.

According to an embodiment, the method of calculating an optical system (OS) of an ophthalmic lens according to a given spectacle frame comprises the steps of:
  providing the resulting contour data set of the spectacle frame,
  providing wearer data,
  optimization of the optical system (OS) according to at least the criteria consisting of the resulting contour data set of the spectacle frame, the wearer data and at least one positioning data, so as to generate at least two optical surfaces ($S_1$, $S_2$).

The provided data may also comprise shape data of the spectacle frame where the shape data may be chosen from, but not limited to, the list comprising:
  the tangent at the surface of the front face of the spectacle frame,
  a 3D digital representation of the spectacle frame,
  the average tore, sphere, cylinder of the front face of the spectacle frame,
  the dihedral angle, the tilt angle of the groove of the spectacle frame.

Shape data can be measured or also be obtained from a spectacle frame data base.

The wearer data comprise at least the wearer prescription data, and may also comprise elements chosen from, but not limited to, the list comprising:
  monocular PD,
  fitting point height,
  the pantoscopic angle,
  the choice of an aesthetic criteria, for example: "1:1", "1:2", "Front curve tracing".

The "front curve tracing" is a criterion in which the bevel is formed so as to adjoin the front surface of the lens with the front surface of the spectacle frame.

The "1:1" is a criterion in which the bevel is formed on the external edge of the ophthalmic lens so as to have the peak of the bevel at equidistance of the front and rear face of the ophthalmic lens.

The "1:2" is a criterion in which the bevel is formed on the external edge of the ophthalmic lens so as to have the distance between the peak of the bevel and the front face of the lens equal to ½ of the distance between the bevel and the rear face of the lens.

In addition to the wearer data the method may comprise a step of providing customization data. The customization data may be chosen from, but not limited to, the list comprising:
  the style of life of the wearer,
  the wearer preference,
  the wearer habits.

The optimization step may depend on the wearer data and the customization data.

Positioning data are used to optimize the optical system. According to the invention, the "positioning parameters" include at least the 3D or 2D position of a face of the lens according to the contour of a face of the spectacle frame.

The positioning parameters may be chosen from, but not limited to, the list comprising:
  a 3D perimeter of the bevel of the ophthalmic lens,
  the distance between the bevel of the ophthalmic lens and the surfaces of one of the face of the ophthalmic lens,
  fitting rules, for example for a unifocal lens placing the optical center at the center of the spectacle frame or in the case of a unifocal aspherical lens 4 mm under the position of the pupil.
  engravings that indicate optical point of reference on one of the surface of the optical lens, for example a fitting cross.

The optimization step will be described in greater details when the optical system is calculated so as to position the front face of the ophthalmic lens according to the front face of the spectacle lens, with the "front curve tracing" aesthetic criteria selected.

Different positioning criteria may be used as illustrated in the different embodiments of the invention.

Edging and beveling parameters may be generated during the optimization step.

Edging and beveling parameters include at least the 2D or 3D position and shape of the bevel on the external profile of the ophthalmic lens.

The edging parameter and beveling parameter may help the edger or the optician during the edging and beveling steps.

During the optimization step one of the generated optical surfaces may be chosen from the list comprising:
  the front surfaces of the lens,
  the rear surface of the lens,
  a diopter surface between the front and rear surface of the lens.

The application WO 2007/017766 teaches a method when having a first surface of an optical system to calculate a second surface of the optical system according to a given prescription.

The invention has been described above with the aid of an embodiment without limitation of the general inventive concept; in particular the optimization criteria are not limited to the examples discussed.

The invention claimed is:
1. A method for determining a contour data set of a spectacle frame rim comprising the steps of:
  a) providing a plurality (N) of three dimensional measured points along a contour of a spectacle frame rim;

b) calculating a plurality of best torus that fits P points chosen among the N measured points and where P is equal or more than 4;

c) selecting the (T) points among the N measured points that deviate from one of the best torus more than a threshold value; and d) forming the contour data set with (N-T) three dimensional measured points where the T selected points of step c) are excluded from the list of three dimensional measured points of step a).

2. The method for determining a contour data set of claim 1, wherein the P points of step b) are consecutive points.

3. The method for determining a contour data set according to claim 1, wherein the best torus to be calculated in step b) are spheres and P=4.

4. The method for determining a contour data set according to claim 1, wherein the best torus to be calculated in step b) are non spherical torus and P=6.

5. The method for determining a contour data set according to claim 1, wherein the P points used to calculate a best torus are different from best torus to best torus.

6. The method for determining a contour data set according to claim 1, wherein before step c), a substep is implemented to calculate the mean and variance of the radii of the best torus calculated in step b) and the threshold value is said variance.

7. The method for determining a contour data set according to claim 1, wherein the contour is a circumference of a spectacle frame.

8. The method for determining a contour data set according to claim 1, wherein the contour is an open path of a spectacle frame.

9. The method for determining a contour data set according to claim 1, wherein the contour is a U-shaped or V-shaped groove of the spectacle frame.

10. The method for determining a contour data set according to claim 1, wherein the contour is an edge of the spectacle frame.

11. A method for providing contour data of a spectacle frame rim comprising the steps of:
   measuring a plurality (N) of three dimensional points along a contour of a spectacle frame rim;
   determining the contour data set according to claim 1; and
   inputting said contour data set in a computer system.

12. The method for providing a contour according to claim 11, wherein the method also comprises inputting in the computer system a set of data including wearer's prescription data.

13. A method of calculating an optical system (OS) of an ophthalmic lens according to a given spectacle frame comprising the steps of:
   providing the contour data set of the spectacle frame according to claim 1,
   providing wearer's data, and
   optimization of the optical system (OS) according to at least the criteria consisting of said contour data set of the spectacle frame, the wearer's data and at least one positioning data, so as to generate at least two optical surfaces $(S_1, S_2)$.

14. A computer program product comprising one or more stored sequence of instruction that is accessible to a processor and which, when executed by the processor, causes the processor to carry out at least one step of claim 1.

15. A non-transitory computer readable medium carrying one or more sequences of instructions of the computer program product of claim 14.

* * * * *